United States Patent [19]

Seo et al.

[11] Patent Number: 4,977,822

[45] Date of Patent: Dec. 18, 1990

[54] KNEADING MEANS OF A HOME AUTOMATIC BREAD BAKING DEVICE

[75] Inventors: Soon K. Seo, Seoul; Hae S. Cho, Suweon, both of Rep. of Korea

[73] Assignee: SamSung Electronics Co., Ltd., Kyung, Rep. of Korea

[21] Appl. No.: 348,841

[22] Filed: May 8, 1989

[30] Foreign Application Priority Data

May 9, 1988 [KR] Rep. of Korea ............... 6971/88
Jun. 24, 1988 [KR] Rep. of Korea ............... 9820/88

[51] Int. Cl.$^5$ .................... A23L 3/00; A47J 27/00
[52] U.S. Cl. .................... 99/348; 366/98; 366/144
[58] Field of Search .......... 99/348, 483; 366/144, 366/145, 146, 69, 96, 97, 98, 99, 100

[56] References Cited

U.S. PATENT DOCUMENTS 4,202,258  5/1980  Masuda ................... 99/348
4,234,605 11/1980  Takeuchi ................. 99/348
4,538,509  9/1985  Ojima .................... 99/348

Primary Examiner—Robert W. Jenkins
Attorney, Agent, or Firm—Robert E. Bushnell

[57] ABSTRACT

A home automatic bread baking device includes an air blowing chamber and a heating chamber having a kneading container, and a kneading means containing a receiving portion for storing a kneading member in a predetermined position in said kneading container; a first projecting member mounted in the lower portion of said heating chamber; at least one elastic supporting member fixed around the circumference adjacent to the upper portion of said heating chamber; a second projecting member formed integrally on the bottom of said kneading container; a circular extending member having a predetermined width which is extended from each side of the upper portion of the kneading container, thereby allowing the kneading container to be closely fixed/coupled into the heating chamber independent of the coupling between the rotary vane and its driving shaft.

22 Claims, 3 Drawing Sheets

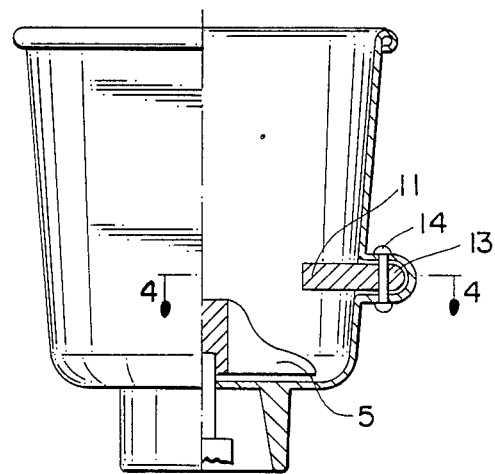
Fig_3
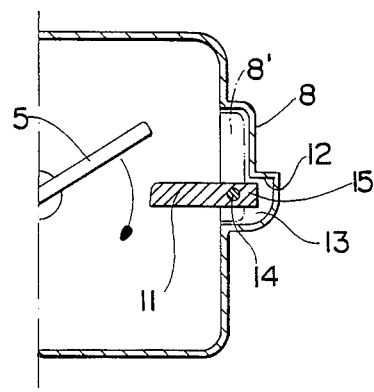
Fig_4

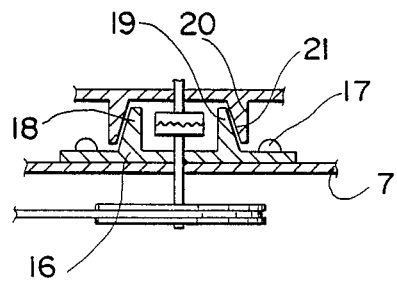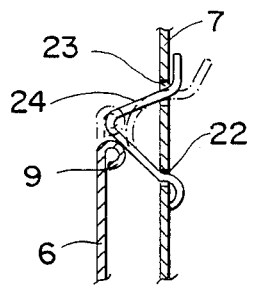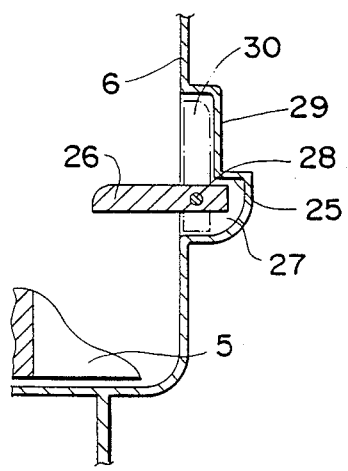

KNEADING MEANS OF A HOME AUTOMATIC BREAD BAKING DEVICE

BACKGROUND OF THE INVENTION

The present invention is related to providing a home automatic bread baking device, particularly to providing an improved structure or kneading device between a kneading container having a rotary vane and a kneading member.

A conventional home automatic bread baking device is general comprised of an air blowing chamber and a heating chamber separated from each other. In a heating chamber, the kneading container is, in most, a right angled tetragon form, but not a regular square and is provided with a groove or a projection formed on at least one side thereof, with a result that a groove or a projection thereof must be fitted into a groove or a projection of a heating chamber to be inserted. Also, the temperature sensor for detecting the temperature of a kneading container is installed into only one portion of a kneading chamber which must be inserted into only one direction when a kneading container is mounted into a heating chamber. Thus, it is inconvenient in a way that the user has to always be careful during inserting a kneading container into a heating chamber.

Also, it has been a problem that a kneading container inserted/coupled into a heating chamber is restrained in a way that its upper portion has to be pushed or pressed due to the shake caused by rotation of the rotary vane. If a kneading container is not firmly inserted into a heating chamber, it often happens that the bread baking is not completely performed due to the malfunction of a bread baking device. Furthermore, in order to position a kneading container exactly on the predetermined place of a heating chamber it must be given close attention.

On the other hand, the kneading procedure is very important to the bread baking procedure. Considering this point, the conventional kneading container was so constructed that the projection has been longitudinally mounted on the inner wall thereof or the general kneading member is mounted to the inner wall thereof opposite to the rotating direction of the rotary vane to force the dough to rotated by the rotating vane, and to be run against the projection or the kneading member.

But, this projection or groove structure for mounting on the inner wall of the kneading container generates the kneading roaring noise colliding the dough against the inner wall. This structure influences ill on the appearance of the bread due to forming the groove on the baked bread by the projection thereof.

Also, the structure for mounting the kneading member of the rod type on the inner wall of the kneading container does not generate the kneading roaring noise due to the kneading operation but it has been a problem that the kneading member must be removed from inside the kneading container after completing the kneading operation.

The typical example having a structure such as this kneading container of a bread baking device is disclosed in U.S. Pat. No. 4,538,509 issued to Mr. Shin Ojima, etc..

That is to say, in this conventional kneading container structure, the mount fixed to the bottom of a kneading container and the flange fixed to a heating chamber are coupled, by means of a pin, to each other so that a kneading container is mounted into a heating chamber. And the rotary vane is provided with the rotary shaft having the upper end, which is connected thereto, and a lower portion of the rotary shaft is constructed in form of the crutch to be coupled with the upper crutch of the rotary shaft, to which the operating force of the motor is transferred, by means of the pulley, as shown in FIG. 3, or the rotary shaft rotating by, means of the pulley is directly fixed to the rotary vane as shown in FIG. 12. A fixed rod is mounted in a kneading container adjacent to and spaced from the rotary vane.

As described above, the structure of this kneading container has numerous problems identifying the disadvantage of the prior art that a kneading container is shaked during rotating the rotary vane and therefore the roaring noise is generated, and if a fixed rod is not removed from said container after finishing the kneading work, the appearance of the baked bread is not good.

Accordingly, the main object of the present invention is to provide an improved structure of a kneading container and a heating chamber in the bread baking device for overcoming these disadvantages.

The other object of the present invention is to provide a coupling structure between a kneading container and a heating chamber to eliminate the vibration of the kneading container during kneading the dough.

Another object of the present invention is to provide a kneading means for performing the kneading operation cooperating with the rotary vane during kneading or to be received into the receiving chamber during heating the dough.

SUMMARY OF THE INVENTION

As to it, the present invention includes an air blowing chamber and a heating chamber having a kneading container, a kneading means comprises the configuration as following:

A first projecting member provided with a projecting portion having a predetermined diameter, the upper end of which is opened, projected in the circular form in the middle of said projecting member and fixed by means of the predetermined means to the center portion of said heating chamber;

A first coupling surface of said projecting member, the inner diameter of which is constant, but on the circumsference of the outer of which the lower diameter is relatively wider and the upper diameter becomes narrower as it goes upward;

A second projecting member projected from the bottom of said kneading container with its lower part being opened opposite to said first projecting member;

A second coupling surface closely coupled to said first projecting member, the outer diameter of which is constant, but on the circumference of the inner of which the diameter near said kneading container is relatively narrower and becomes wider as it goes downward;

An elastic member elastically supports the upper portion of said kneading container, which is mounted adjacent to and projected from said heating chamber;

At least one extending member projected from a plurality of the predetermined position on the upper portion of said kneading container to be elastically supported on said elastic supporting member;

A receiving portion formed on one wall of said kneading container to store the kneading member for a while according to the forward and reverse rotating direction of the dough for kneading effectively the dough at a speed rate by cooperating with said rotary vane;

Whereby said kneading container is closely fixed/-coupled into said heating chamber independent of the coupling between said rotary vane and its driving shaft.

Therefore, the present invention has various advantages: that the kneading container is in form of the square to be easily inserted into the heating chamber even in any directions and to be stably mounted thereinto without being shaken due to rotation of the rotary vane after being inserted, and the kneading member is automatically extended from the receiving portion of the kneading container or stored thereinto according to the forward-reverse rotating directions of the dough to keep the good appearance of the baked bread during the kneading operation.

BRIEF DESCRIPTION OF THE DRAWINGS

The above and other objects of the present invention will be seen by the following description in connection with the accompanying drawings, in which:

FIG. 3 is a longitudinal cross-sectional view of a kneading container having a kneading means of the present invention enlarged in part;

FIG. 4 is a plan cross-sectional view representing a kneading means of a kneading container enlarged in part;

FIG. 5 is an enlarged cross-sectional view representing the coupling between the lower projecting member of a kneading container and a holder fixed to the bottom of a heating chamber;

FIG. 6 is an enlarged cross-sectional view representing the state that the extending portion on the upper of a kneading container is elastically supported by elastic supporting member mounted on the upper of a heating chamber;

FIG. 7 is a cross-sectional view representing other embodiment according to a kneading means of the present invention.

DETAIL DESCRIPTION OF THE INVENTION

Figure 1:
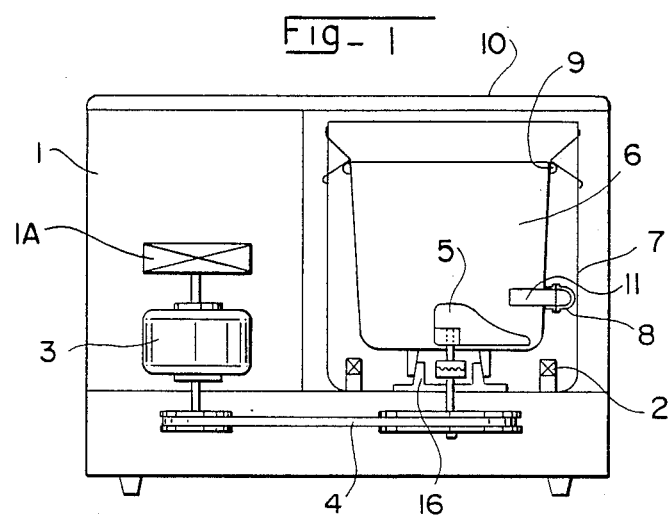
FIG. 1 is a schemetically cross-sectional view of a bread baking device into which a kneading means of the present invention is installed.

FIG. 1 represents the structure for coupling the kneading container with the heating chamber, which are constructed according to the principle of the present invention.

As shown in the drawings, automatic bread baking device 10 is generally provided with air blowing chamber 1 and heating chamber 7 separately installed therein, in which blowing fan 1A and motor 3 are mounted in air blowing chamber 1, heaters 2 are mounted on both sides of the bottom of heating chamber, and kneading container 6 having rotary vane 5 connected through pulley 4 to motor 3 to be rotated by the driving force of motor 3 is installed in heating chamber 7.

Figure 2:
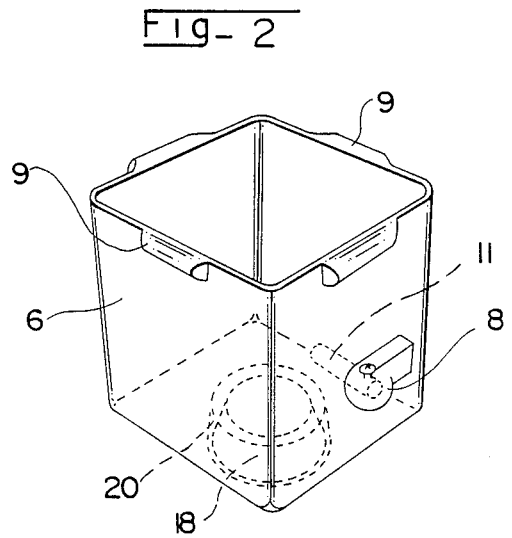
FIG. 2 is a perspective view of a kneading container according to the present invention.

In the bread baking device described above, the present invention is constructed as follow:

As shown in FIG. 2, circular extending portion 9 having the predetermined width is extended from and integrally formed on each side of the upper portion of kneading container 6. Also, receiving portion 8 having a predetermined depth in the lateral direction is formed at the predetermined height of one inner wall of kneading container 6 to store kneading member 11 as described below.

This receiving portion 8 has rotating space portion 13 for allowing the rotating of one end of the kneading member (referred to as the rotating portion thereafter), at one end of which step portion is formed and a cavity portion 8' receiving the other end thereof. In rotating portion 13, conventional angled rod type of kneading member 11 has one end mounted rotatably by means of a shaft pin 14 on one portion of rotating portion 11 so that it is positioned at the same line of the inner wall or sink into the inside of cavity portion 8' when kneading member 11 is received into receiving portion 8. If kneading member 11 escapes/extends out of receiving portion 8, the inner side end 15 of kneading member 11 contacts step portion 12 to extend perpendicular to the inner wall of kneading container 6. And motor 3, rotating the rotating vane, is rotatable in the forward and reverse directions and transmits its rotation force through pulley 4 to rotating vane 5.

On the other hand, as shown in FIG. 5, first projecting member or holder 16 is fixed by means of the screw to the inner bottom of heating chamber 7 which is configured as bread baking device 10. This holder 16 is provided with projecting portion 18 having a predetermined height. This projecting portion 18 is opened at its upper portion and provided with first coupling surface 19, in which the inner diameters of the upper and the lower are identical to each other, but at the outer circumference the lower diameter is relatively wider and the upper diameter is made narrower to form the outer surface as the slanted surface.

This holder 16 is coupled to second projecting member or supporting frame 20 of kneading container 6. Supporting frame 20 is integrally molded on the bottom of kneading container 6 with its lower portion being opened and provided with second coupling surface 21, in which the outer diameters of the upper and the lower portions are the same but the inner diameter is relatively narrower near the bottom of kneading container 6 and is made wider to form the inner surface as a slanting surface.

As shown in FIG. 6, elastic supporting member 24, which is a leaf spring having the elastic force, is mounted adjacent to the upper portion of heating chamber, one end and another end of which are inserted into hole 22 and hole 23, respectively, to be fixed to the inner wall of heating chamber.

Thus, kneading container 6 is tightly coupled to heating chamber 7 eliminating the shaking caused by the rotation of the rotary vane with the result that supporting frame 20 is mounted into holder 16, and upper extending portion 9 is elastically supported by elastic supporting member 24.

FIG. 7 represents receiving portion 29 according to another embodiment of the present invention. Receiving portion 29 is longitudinally formed on the inner wall of kneading container 6, in which step portion 25 is formed on the predetermined position of the inner wall, rotating portion 27 is formed to allow kneading member 26 to be rotated, and cavity portion 30 is formed to partly or entirely receive the other end of kneading member 26 rotating centering pin 28.

Thereafter, the acting effect of the present invention will be explained as follows:

As shown in FIG. 3, receiving portion 8 is formed in the inner wall of kneading container 6 to force kneading member 15 to be received thereinto or projected therefrom. If the dough is rotated in the forward direction, or rotary vane 5 is rotated in the clockwise direction as shown in FIG. 4, the inner end of kneading member 15, which is being stopped at the first time (or which is not being received entirely in receiving portion) is in contact with step portion 12, and kneading member 15 is extended into the inner portion of kneading container 6 to perform the kneading operation.

After finishing the kneading operation, when motor 3 is rotated in the counterclockwise by the control operation, the dough is rotated in the counterclockwise and kneading member 15 being supported by step portion 12 is automatically received or stored into receiving portion 8 by the dough.

Also, supporting frame 20 is formed in the shape of the groove at the bottom of kneading container 6 to have second coupling surface 21 provided with the lower portion being relatively wider and the upper portion being slightly narrower than the lower portion therein. Projecting portion 18, in the middle of holder 16 and in opposition to supporting frame 20, has first coupling surface 19 provided with the upper portion being relatively narrower and the lower portion being narrower than the upper portion. During coupling support frame 20 into holder 16, second coupling surface 21 is slidablely mounted onto first coupling surface 19 to be easily coupled to each other, and on the contrary to be easily separated from each other during removing kneading container 6 from heating chamber 7.

Extending portions 9 formed outwardly at the center of four sides from the upper circumference of kneading container 6 respectively is contacted with elastic supporting member 24, both ends of which are inserted into hole 22 and 23 in the inner wall of heating chamber 7 to have the elastic force. Therefore, as shown in FIG. 6 extending portion 9 is elastically supported relative to elastic supporting member 24, so that kneading container 6 is mounted in heating chamber 7 with its upper portion is supported at four sides by elastic supporting members 24. As a result, kneading container 6 is not shaken leftwardly and rightwardly or vibrated upwardly and downwardly while rotary vane 5 is rotated, so that the relief relative to the article is given. Also, kneading container 6, as used in the present invention, is in a form of the square to mounte its supporting frame 20 onto projecting portion 18 in all directions, and extending portion 9 is pressed downwardly by elastic supporting member 24 to contact second coupling surface 21 with first coupling surface 18 closely.

What is claimed is:

1. A home automatic bread baking device including a separate air blowing chamber and a heating chamber, with the heating chamber having a kneading container, comprising;
   a receiving portion for storing a kneading member in a predetermined position in said kneading container;
   a first projecting member mounted in the lower portion of said heating chamber;
   at least one elastic support member fixed around the circumference of and adjacent to the upper portion of said heating chamber;
   a second projecting member formed integrally on the bottom of said kneading container to engage said first projecting member; and
   a circularly extending member having a width extending from each side of the upper portion of said kneading container to engage said elastic support member.

2. A device as claimed in claim 1, wherein
   said receiving portion comprises a rotating portion for allowing a first end of the kneading member to be fixed therein while enabling a second end of the kneading member to be rotated from the receiving portion to extend into the interior of said kneading container, and a cavity portion for storing the second end of said kneading member if necessary.

3. A device as claimed in claim 1, wherein:
   an outer surface of said first projecting member provides a first coupling surface with the lower diameter of the first projecting member being relatively wider and tapering upward to a narrower upper diameter, and
   an inner surface of said second projecting member provides a second coupling surface with the upper diameter of the second projecting member being relatively narrower and widening downwardly to a greater lower diameter.

4. A device as claimed in claim 1, wherein
   a said extending member is formed on the upper portion of said kneading container and is elastically engaged by said elastic support member mounted adjacent to the upper portion of said heating chamber.

5. A device as claimed in claim 1, wherein
   a receiving portion is formed in the inner wall of said kneading container.

6. An automatic bread baking device, comprising:
   a heating chamber having a heating member disposed therein;
   an air blowing chamber for cooling said heating chamber;
   a kneading container insertable into said heating chamber said kneading container, having a rotary vane disposed on the inner bottom surface thereof to knead dough;
   a plurality of extending members having predetermined width and length, disposed to protrude from each upper edge of said kneading container; and
   at least one flexible supporting member mounted on said heating chamber to closely contact an adjacent one of said extending members and thereby support an upper portion of said kneading container.

7. The device of claim 6, further comprised of:
   first projecting means forming a cylindrical body providing a tapered first bearing surface, centrally depending downwardly from one lower portion of said kneading container; and
   second projecting means disposed within a lower region of said heating chamber and providing a tapered second bearing surface, for mating with said first projecting means and supporting said kneading container.

8. The device of claim 7, further comprised of:
   said first projecting means providing said first bearing surface with opposite portions of said first bearing surface nearest to said base defining a first width greater than a second width defined by opposite portions of said first bearing surface nearest to said lower portion of said kneading container; and
   said second projecting means providing said second bearing surface with opposite portions of said second bearing surface most distant from said lower region defining a third width greater than said first width but less than said second width, and opposite portions of said second bearing surface nearest to said lower region defining a fourth width greater than said second width.

9. An automatic bread baking device, comprising:
a heating chamber having a heating member disposed therein;
an air blowing chamber for cooling said heating chamber;
a kneading container receivable into said heating chamber with rotary vane means for kneading dough, said kneading means, being positioned on an inner bottom of the kneading container;
first projecting means shaped in the form of the cylindrical body from a central lower portion outside said kneading container with a base of the first projecting member being open; and
second projecting means disposed on a bottom of said heating chamber, for being inserted into said first projecting means and supporting the lower portion of said kneading container.

10. The device of claim 9, wherein:
an inner surface of said first projecting means provides a first slanted surface, a lower diameter of said first slanted surface is slightly wider than an upper diameter of said first slanted surface, and an outer surface of said second projecting member provides a second slanted surface facing to said first slanted surface to facilitate coupling with said first slanted surface.

11. The device of claim 9, further comprised of:
a plurality of extending members disposed to protrude from upper portions of each exterior side of said kneading container; and
means mounted on said heating chamber, for contacting a closest one of said extending members and thereby supporting said kneading container while said kneading container is inside said heating chamber.

12. An automatic bread baking device, comprising:
a heating chamber having a heating member disposed therein;
an air blowing chamber for cooling said heating chamber;
a kneading container receivable into said heating chamber with a rotary vane kneading dough disposed within an interior of the container;
a kneading member rotatably installed on an inner wall of said container to extend into the interior of the container; and
a receiving portion formed in the inner wall of said kneading container to receive the entirety of said kneading member from the interior.

13. The device of claim 12, further comprised of:
a plurality of extending members disposed to protrude outwardly from upper portions of each exterior side of said kneading container; and
means mounted on said heating chamber, for contacting a closest one of said extending members and by supporting said kneading container while said kneading container is inside said heating chamber.

14. The device of claim 12, further comprising:
a pin, wherein one end of said kneading member is rotatably attached by the pin to said receiving portion, and said receiving portion is provided with a rotating portion including a step portion formed therein for controlling the extent of rotation of said kneading member, and a cavity portion for storing a second end of said kneading member.

15. The device of claim 14, wherein said receiving portion is formed in said inner wall of said kneading container.

16. The device of claim 12, further comprised of:
first projecting means forming a cylindrical body providing a tapered first bearing surface, centrally depending downwardly from one lower portion of said kneading container; and
second projecting means disposed within a lower region of said heating chamber and providing a tapered second bearing surface, for mating with said first projecting means and supporting said kneading container.

17. The device of claim 16, further comprised of:
said first projecting means providing said first bearing surface with opposite portions of said first bearing surface nearest to said base defining a first width greater than a second width defined by opposite portions of said first bearing surface nearest to said lower portion of said kneading container; and
said second projecting means providing said second bearing surface with opposite portions of said second bearing surface most distant from said lower region defining a third width greater than said first width but less than said second width, and opposite portions of said second bearing surface nearest to said lower region defining a fourth width greater than said second width.

18. An automatic bread baking device, comprising:
a heating chamber having a heating member disposed therein;
an air blowing chamber for cooling said heating chamber;
a kneading container receivable into said heating chamber with rotating vane means for kneading dough, disposed on the inner bottom surface of the kneading container;
a plurality of extending members having predetermined width and length, protruding from each upper edge of said kneading container; and
at least one flexible supporting means mounted on said heating chamber for closely contacting a closest one of said extending members to thereby support an upper portion of said kneading container.

19. The device of claim 18, further comprised of:
first projecting means forming a cylindrical body providing a tapered first bearing surface, centrally depending downwardly from one lower portion of said kneading container; and
second projecting means disposed within a lower region of said heating chamber and providing a tapered second bearing surface, for mating with said first projecting means and supporting said kneading container.

20. The device of claim 19, further comprised of:
said first projecting means providing said first bearing surface with opposite portions of said first bearing surface nearest to said base defining a first width greater than a second width defined by opposite portions of said first bearing surface nearest to said lower portion of said kneading container; and
said second projecting means providing said second bearing surface with opposite portions of said second bearing surface most distant from said lower region defining a third width greater than said first width but less than said second width, and opposite portions of said second bearing surface nearest to said lower region defining a fourth width greater than said second width.

21. An automatic bread baking device, comprising:
a heating chamber having a heating member disposed therein;
air blowing chamber means for cooling said heating chamber;
a plurality of extending members having predetermined width and length, protruding from each upper edge of said kneading chamber;
at least one elastic supporting member mounted on said heating chamber and closely contacting said extending member to thereby support an upper portion of said kneading container;
a first projecting member protruding in the form of the cylindrical body from a central lower portion outside said kneading container with a lower region of said cylindrical body being open;
a second projecting member disposed on the bottom of said heating chamber, insertable into said first projecting member and supporting the lower portion of said kneading container;
a kneading member installed on an inner wall of said container to rotate into said kneading container; and
a receiving portion formed in the inner wall of said kneading center to receive said kneading member from said kneading center.

22. The device of claim 21, further comprising:
a pin, wherein one end of said kneading member is rotatably attached by the pin to said receiving portion, and said receiving portion is provided with a rotating portion including a step portion formed therein for controlling the extent of rotation of said kneading member, and a cavity portion for storing a second end of said kneading member.

* * * * *